US006653797B2

(12) United States Patent
Puleo, Sr. et al.

(10) Patent No.: US 6,653,797 B2
(45) Date of Patent: Nov. 25, 2003

(54) APPARATUS AND METHOD FOR PROVIDING SYNCHRONIZED LIGHTS

(76) Inventors: Salvatore J. Puleo, Sr., 15 Sequoia Dr., Watchung, NJ (US) 07060; Michael M. McRae, 19058 Sioux Dr., Spring Lake, MI (US) 49456

( * ) Notice: Subject to any disclaimer, the term of this patent is extended or adjusted under 35 U.S.C. 154(b) by 23 days.

(21) Appl. No.: 09/978,238

(22) Filed: Oct. 15, 2001

(65) Prior Publication Data

US 2002/0135315 A1 Sep. 26, 2002

Related U.S. Application Data

(60) Provisional application No. 60/278,247, filed on Mar. 22, 2001.

(51) Int. Cl.[7] ............................ H02J 1/00; H05B 37/00

(52) U.S. Cl. ............................... 315/185 S; 315/185 R; 307/10.08; 307/11; 362/121; 362/123; 439/236

(58) Field of Search ......................... 315/185 S, 185 R, 315/193, 194, 293, 294, 363, 56, 57, 58; 439/236; 362/121, 123, 252, 566, 567; 307/10.1, 10.8, 11, 36

(56) References Cited

U.S. PATENT DOCUMENTS 1,974,472 A * 9/1934 Seghers ...................... 307/157
2,611,065 A * 9/1952 Adams et al. .............. 200/293
4,068,118 A 1/1978 Carrington .................. 362/123
4,125,781 A * 11/1978 Davis, Jr. ..................... 307/11
4,215,277 A 7/1980 Weiner et al. ................ 307/41
4,678,926 A 7/1987 Davis .......................... 307/11
4,890,000 A * 12/1989 Chou .......................... 307/36
5,006,724 A 4/1991 Liu ............................. 307/11
5,103,380 A 4/1992 Lindner et al. ............... 362/32
5,300,864 A 4/1994 Allen, Jr. .................... 315/314
5,345,147 A 9/1994 Wu ............................ 315/185
5,629,587 A * 5/1997 Gray et al. ................. 315/292
5,639,157 A * 6/1997 Yeh ............................ 362/567
5,670,847 A * 9/1997 Lin ........................ 315/185 S
6,157,139 A * 12/2000 Gibboney, Jr. ........... 315/185 S
6,373,196 B2 * 4/2002 Liu ........................ 315/185 S
6,392,553 B1 * 5/2002 Mollet et al. ............... 340/642

* cited by examiner

*Primary Examiner*—Tan Ho
(74) *Attorney, Agent, or Firm*—Brian K. Johnson, Esq. LLC

(57) ABSTRACT

A synchronized lighting system is disclosed having a plurality of light strings. Individually, the light strings have groups of light bulbs, e.g. color groups, coupled to a power source that is driven by a sequencer that independently controls the power sequencing for the different light groups. The light strings have a configurable connector coupled to both the sequencer and the power source for controlling the routing of power control signals issued by the sequencer to the power source. The connector is capable of being coupled to the configurable connectors of other light stings with interconnecting wiring such that the power control signals from one light string sequencer may be distributed to the other connected and properly configured light strings. The connector is configurable in one of several modes: a stand-alone mode where the sequencer issues power control signals for its own power source, a master mode that extends the stand-alone functionality to include the transmission of the power control signals from the sequencer over wiring coupled to the master connector, and a slave mode in which the connector routes power control signals from coupled wiring to the power source. In one embodiment, the synchronized system is obtained when one connector within the plurality of interconnected light strings is configured as a master and other connectors are configured as slaves thereby allowing one sequencer to synchronously control the power sequencing of both its own groups of lights and those of the other light strings.

19 Claims, 7 Drawing Sheets

APPARATUS AND METHOD FOR PROVIDING SYNCHRONIZED LIGHTS

CROSS-REFERENCE TO RELATED APPLICATIONS

This application claims the benefit of the U.S. Provisional Patent Application having Ser. No. 60/278,247 and filed on Mar. 22, 2001, the disclosure of which is incorporated by reference herein.

FIELD OF THE INVENTION

The present invention involves an apparatus and method for controlling decorative lighting strings using a digital controller to synchronize different light groups on a plurality of decorative lighting strings. In particular, a control unit is added to each of a plurality of lighting strings, each light string having a plurality of light bulbs thereon. One control unit is configurable as a master control unit. The plurality of light strings are daisy chained together to form longer decorative strings. The remaining, daisy chained control units are configured as slave control units and are connected to the master control unit such that the illumination commands generated by the master control unit are distributed among the plurality of lighting strings. This distribution of illumination commands permits similar groups of light bulbs on each of the plurality of lighting strings to be synchronously controlled by the master control unit.

BACKGROUND

Numerous systems have been created that control the brightness or the on/off state of the lights that are part of either a decorative string of lights or a lighted holiday display. Most of these inventions describe a different method and apparatus for controlling the amount and duration of power applied to the bulbs or to the creation of different lighting sequences used to illuminate the bulbs of the light string.

As one example, U.S. Pat. No. 4,890,000 entitled Control Circuit of the Decorative Light Sets ("the Chou patent") provides a digital control circuit for controlling the illumination sequence of a plurality of lamp bulbs to create a decorative light display. In particular, both of the control circuits in the Chou patent include an oscillator electrically coupled to each of two decoders. Each of the oscillators provides a different working frequency at which to drive their respective decoders, the outputs of which trigger the on/off ("blinking") function of the associated lights through a switch control means. As a result, all the lamp bulbs on each of the plurality of light strings are toggled on and off according to lighting patterns provided by their associated decoders and at a variable rate determined by the output frequency of their associated oscillators.

As another example, U.S. Pat. No. 5,639,157 entitled Decorative String Lighting System ("the Yeh patent") provides a light string that is particularly suited for decorating a Christmas tree. The light string of Yeh includes a control unit and a multiplicity of illuminators, each driven by a separate circuit power path. An integrated circuit controller is capable of individually activating each of the different power paths so as to control each group of similarly colored lights. Although a multiplicity of light bulb colors and types may be included on a single bus of power leads, the light string is long enough to cover a Christmas tree. Multiple individual light strings may be used to cover distances longer than that of a single light string. However, such a series of light strings would be without the ability to achieve synchrony between the illumination patterns produced by the control mechanisms of the individually controlled light strings.

As another example, U.S. Pat. No. 4,125,781 entitled Christmas Tree Lighting Control ("the Davis, Jr. patent") provides an outlet extension cord having multiple outlets at a terminal end. Each of the outlets is powered by an individual power bus controlled by a different duty cycle controller. Thus, multiple strings of lights may be plugged into the extension outlets with each string receiving a different power duty cycle, thereby producing different flickering rates as between each string of lights. However, like the Yeh patent, such a series of light strings would be without the ability to achieve synchrony as between similar groups of light bulbs on the light strings, for example, the illumination of only the blue bulbs on each light string.

As another example, U.S. Pat. No. 5,629,587 entitled Programmable Lighting Control System for Controlling Illumination Duration and Intensity Levels of Lamps on Multiple Lighting Stings ("the Gray et al. patent") describes a complex computer controlled system in which programmed light sequences, including light intensity variations, are driven by a central CPU to a multiple outlet extension arrangement. As with the Davis, Jr. patent, multiple power outlets are individually controlled by a sophisticated programmable processor. Thus, multiple strings of lights may be plugged into the extension outlets with each string controlled by a different power sequence, thereby producing different visual effects as between the light strings. However, like the Davis, Jr. patent, such a series of light strings would be without any capability to achieve synchrony between similar groups of light bulbs on each of the light strings.

Thus, the need exists to create a sequenced controller or digital control circuitry that controls a plurality of light stings, one of the light strings coupled to a master control unit, the remaining light strings coupled to the master control unit and the remaining controllers configured as slave control units. Such configuration permits the master controller unit to synchronously control a plurality of light strings on a individual, group-wise basis.

SUMMARY OF THE INVENTION

In a preferred embodiment of the present invention, the invention includes a control unit for attachment to a light string. The light string has a plurality of lights, the plurality of lights are arranged as a plurality of sets of lights and each set of lights displays a single color. The control unit has a light driver coupled to the plurality of lights with a power bus for controlling power to the plurality of lights, and the power bus has individual power control signals for controlling power to each set of lights displaying the same color. A sequence controller is coupled to the light driver with a control bus, and the sequence controller generates a plurality of light control signals transmitted over the control bus, each light control signal operatively coupled by the light driver to one of the individual power control signals. A connector is coupled to the control bus and includes a set of transmitting leads for transmitting the control signals on the control bus outside of the control unit. The connector further includes a set of receiving leads for receiving control signals on the control bus from outside of the control unit; and a configuration selector. The configuration selector couples the sequence controller, the light driver and the transmitting leads so that the control signals from the sequence controller are routed over the control bus to the light driver and the transmitting leads in a first configuration. The configuration selector decouples the sequence controller from the light driver and couples the receiving leads to the light driver so that the control signals from the receiving leads are router over the control bus to the light driver in a second configuration.

In other aspects of the invention, the control unit of the invention further includes an AC to DC converter coupled to the light driver for supplying power to the light driver and may further include a pattern control knob coupled to the sequence controller for actuating the sequence controller to generate the light control signals. Also the configuration selector may include a connector plug for coupling with the connector where the connector plug includes the couplings of either the first or the second configurations. In another aspect of the invention, the sequence controller includes a microcontroller. Still further, the sequence controller includes a personal computer.

In another particularly preferred embodiment, the present invention for a system of synchronized lighting includes a plurality of light strings. Each light string has a plurality of lights, the plurality of lights are arranged as a plurality of sets of lights. Each set of lights displays a single color. A control unit is coupled to each light string and the plurality of lights, and includes a light driver coupled to the plurality of lights with a power bus for controlling power to the plurality of lights. The power bus has individual power control signals for controlling power to each set of lights displaying the same color. A sequence controller is coupled to the light driver with a control bus. The sequence controller generates a plurality of light control signals transmitted over the control bus, and each light control signal is operatively coupled by the light driver to one of the individual power control signals. A connector is coupled to the control bus and includes a set of transmitting leads for transmitting the control signals on the control bus outside of the control unit. The connector further includes a set of receiving leads for receiving control signals on the control bus from outside of the control unit. A configuration selector couples the sequence controller, the light driver and the transmitting leads so that the control signals from the sequence controller are routed over the control bus to the light driver and the transmitting leads in a first configuration. The configuration selector decouples the sequence controller from the light driver and couples the receiving leads to the light driver so that the control signals from the receiving leads are router over the control bus to the light driver in a second configuration. One of the plurality of control units has the first configuration and all other of the control units have the second configuration. The transmitting leads of the control unit having the first configuration are coupled to the receiving leads of each of the control units having the second configuration. The sequence controller of the control unit having the first configuration generates control signals that are routed to each light driver so as to simultaneously control each set of lights having the same color on each of the plurality of light strings.

In other aspects of the invention, the system further includes a pattern control knob coupled to the sequence controller of the control unit having the first configuration for actuating the sequence controller to generate the light control signals. Further, the configuration selector may include a connector plug for coupling with the connector, the connector plug including the couplings of either the first or the second configurations. In addition, the control units may be dynamically configurable between the first and the second configurations.

In yet another particular embodiment of the present invention, a system for synchronizing a plurality of lights, the system includes first and second light strings having a first and second plurality of lights respectively. A first light group includes a subset of lights from the first plurality of lights. A second light group including a subset of lights from the second plurality of lights. A sequence controller is coupled to the first light string and the first plurality of lights and generates control signals transmitted over the coupling for controlling the first light group. A first connector is coupled to the first light string, the first plurality of lights and the sequence controller. The first connector includes signal paths for transmitting the control signals. A second connector is coupled to the second light string and the second plurality of lights. The second connector includes signal paths for receiving the control signals and is connected to the first connector with an interconnection cable. The interconnection cable is capable of transmitting the control signals between the first and the second connectors. The sequence controller synchronously controls both the first light group and the second light group via the control signals transmitted over the first and second connectors and the an interconnection cable.

In a particular aspect of the above invention, the system further includes a first light driver and a second light driver coupled to the first light string and the second light string respectively. The first and second light drivers provide power to the first plurality of lights and the second plurality of lights respectively. Further, the first and second groups of lights may include groups of lights of the same color.

In another embodiment of the present invention, a system for synchronizing a plurality of lights, includes a plurality of light strings. Each light string includes a plurality of lights. The plurality of light strings include a master light string. The plurality of lights within each light string are associated with a plurality of light groups, in which each light group includes a subset of the plurality of lights on each light string. A master connector is coupled to the master light string and the included plurality of lights. A sequence controller is coupled to the master connector and generated control signals transmitted over the coupling for controlling each light group within the plurality of lights on the master light string. A plurality of slave connectors are coupled to one of the remaining plurality of light strings and the included plurality of lights and to at least one other connector with an interconnection cable. At least one slave connector is also directly coupled to the master connector with an interconnection cable. The plurality of slave connector couplings are arranged such that each of the plurality of light strings and the included plurality lights is also coupled to the master connector. The interconnection cable is capable of transmitting signals between coupled connectors for controlling each light group within the coupled light strings, the sequence controller and independently controlling each light group of the master light string in synchrony with the plurality of light groups of the remaining light strings via the plurality of couplings of the master and slave connectors.

A particularly preferred method of synchronously controlling a plurality of lights according to the present invention includes the steps of configuring a first control bus of a first control unit, the step of configuring including coupling a sequence controller, a first light string and to a first connector to the control bus where the first light string has a plurality of lights and the plurality of lights of the first light string includes a plurality colors. The method also includes configuring a second control bus of a second control unit, the step of configuring including coupling a second connector, a second light string, and a second control bus, where the second light string has a plurality of lights and the plurality of lights of the second light string are arranged as a plurality of sets of lights. The plurality of lights of the second light string include a plurality colors. The method also includes the step of coupling the first connector and the second connector so as to couple the first and second control buses and generating the control signals with the sequence controller. The method further includes the step of routing the control signals to the first and second control busses and the plurality of lights of the first and second light strings to simultaneously control lights of the same color.

In yet another embodiment of the present invention, the system for synchronously controlling a plurality of lights includes a plurality of light strings where each light string includes a plurality of lights. The plurality of light strings includes a master light string. The plurality of lights within each light string are associated with a plurality of light groups. Each light group includes a subset of the plurality of lights on each light string. A master connector is coupled to the master light string and the included plurality of lights. A sequence controller is coupled to the master connector and the sequence controller generates control signals that are transmitted over the coupling for controlling each light group within the plurality of lights on the master light string. A plurality of slave connectors are coupled to one of the remaining plurality of light strings and the included plurality of lights. Each of the slave connectors is coupled to at least one other connector with an interconnection cable and at least one slave connector is coupled directly to the master connector with a an interconnection cable. The plurality of slave connector couplings are arranged such that each of the plurality of light strings and the included plurality lights is also an interconnection cable to the master connector. The interconnection cable is capable of transmitting signals between coupled connectors for controlling each light group within the coupled light strings. The sequence controller independently controls each light group of the master light string in synchrony with the plurality of light groups of the remaining light strings via the plurality of couplings of the master and slave connectors.

DETAILED DESCRIPTION OF THE INVENTION

Figure 1:
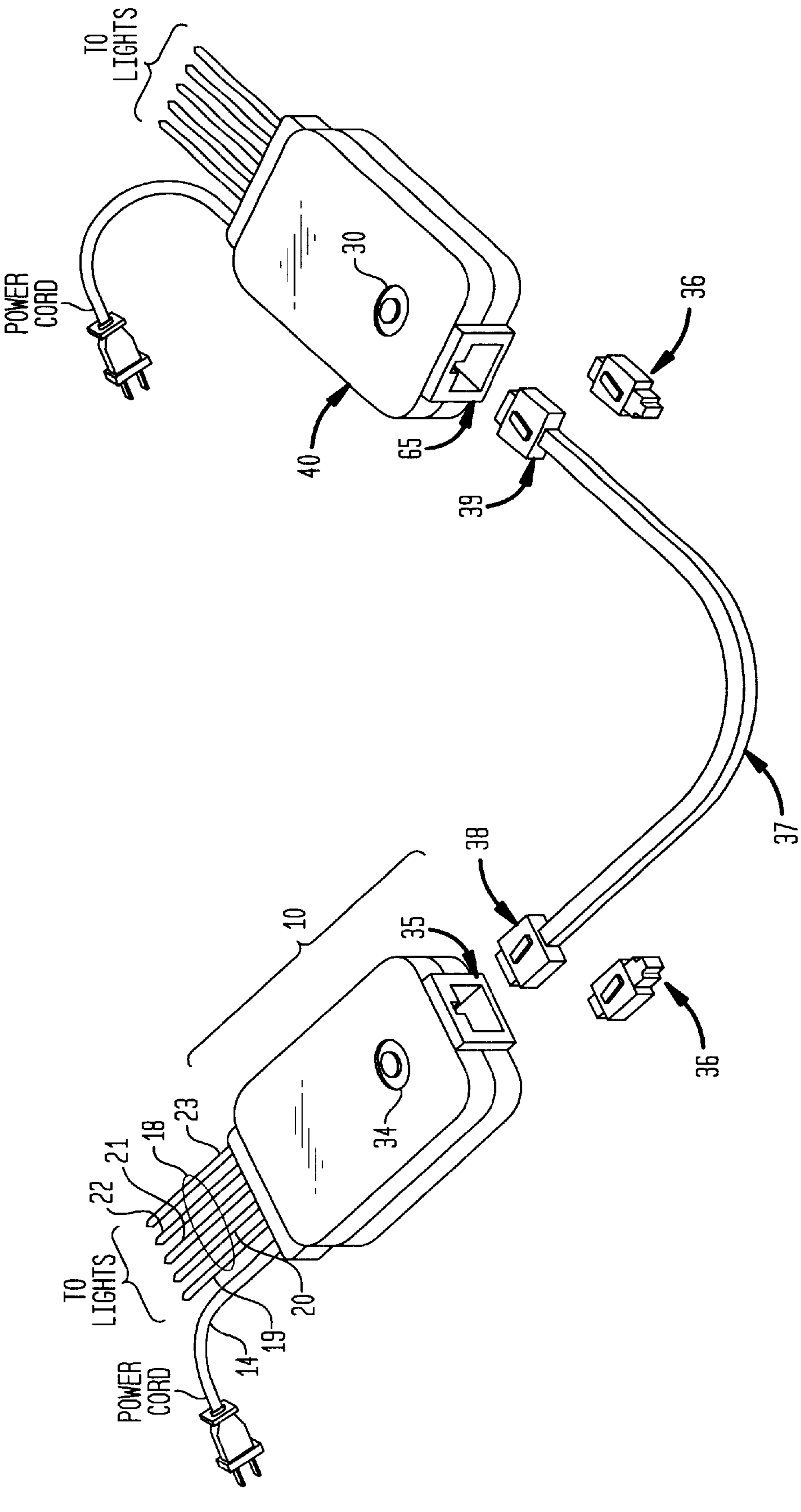
FIG. 1 is an oblique view of an exemplary light control system including a master control unit, a slave control unit and a connector cable according to one embodiment of the present invention.

Referring to FIG. 1, an external view of the control units is shown at 10 and 40, according to a preferred embodiment of the present invention. Control unit 10 and control unit 40 are identical in appearance and internal mechanical and electrical structure. Each control unit is configurable to perform in stand-alone mode or as one of a pair of master and slave control units via male configuration plugs inserted into connectors that are part of the control units. The details of the configurability of the control units are described later.

In FIG. 1, master control unit 10 includes a power cord connector 14 that supplies external, AC power from an electrical outlet to the circuitry within the master connector. For example, power cord 14 may be plugged into a North American standard 120 volt AC outlet. Master control unit 10 is also connected to a light string (not shown) having a plurality of light bulbs, a plurality of lighted elements or a plurality of light power loads. The illumination of the connected light power loads is controlled by the electrical power provided on light power bus 18, which includes individual power signal paths 19–23. Each of the individual power signal paths supplies power to a set of light bulbs coupled to the power signal path, for example lights of the same color or lights at certain locations along light string. In the example of individual color groups, a common power signal 23 is provided for all the light power loads on the light string. Each individual group of similarly colored lights are coupled to one of the power signal paths 19–22. For example, the red lights may be supplied by power on power signal path 19, the blue lights may be supplied by power on power signal path 20, the green lights may be supplied by power on power signal path 21, and the yellow lights may be supplied by power on power signal path 22.

Also included on control units 10 and 40 are sequence advance control buttons 30 and 34 respectively that are used to advance the programmed illumination sequence stored within the control unit and to cause the activation of power signals on light power bus 18. Each control unit also includes a female connector 35 and 65. Through the proper selection of plugs and connectors, the control unit can be configured to operate one of three states: 1) a stand-alone configuration, i.e. without other light strings or control units electrically coupled to the stand-alone control unit; 2) in a master control unit configuration 10; or 3) in a slave control unit configuration 40. In the master-slave configuration, a plurality of light strings, each having associated control units configured as slaves, may be electrically coupled to at least one light string having a master control unit configuration. In a preferred embodiment, a removable male jumper plug 36 is physically inserted into the female connector 35 to provide an electrical coupling within the female connector to achieve the desired configuration. In a particularly preferred embodiment of the present invention, master male connector 38 is electrically coupled to slave male connector 39 with connection cable 37. Master-slave control unit pair, 10 and 40, are then coupled when master male connector 38 is physically inserted into the female connector 35 to provide an electrical coupling to a master control unit and slave male connector 38 is physically inserted into the female connector 65 to provide an electrical coupling within the female connector 65, so as to configure the control unit 40 as a slave control unit.

Control units 10 and 40 are preferably constructed of inexpensive, molded polyurethane plastic and are preferably of a rectangular box shape. For example, control units 10 and 40 may be composed of two clam shell halves that are screwed, glued or otherwise affixed together. Enclosed within each darn shell is the control circuitry necessary to perform the functions of the present invention. Power cord 14 may be any UL approved power cord of appropriate current rating for insertion into standard AC outlets, the requirements of which may vary from country to country. Light power bus 18 may consist of standard electrical wiring used to provide electrical connectivity to indoor or outdoor lighting strings or lighting displays that are to be controlled by control units 10 and 40. Female connectors 35, 65, male stand-alone configuration plugs 36 and master-slave male connectors 38 and 39 may, for example, conform to the physical and electrical industry standard category 45 wiring.

Figure 2:
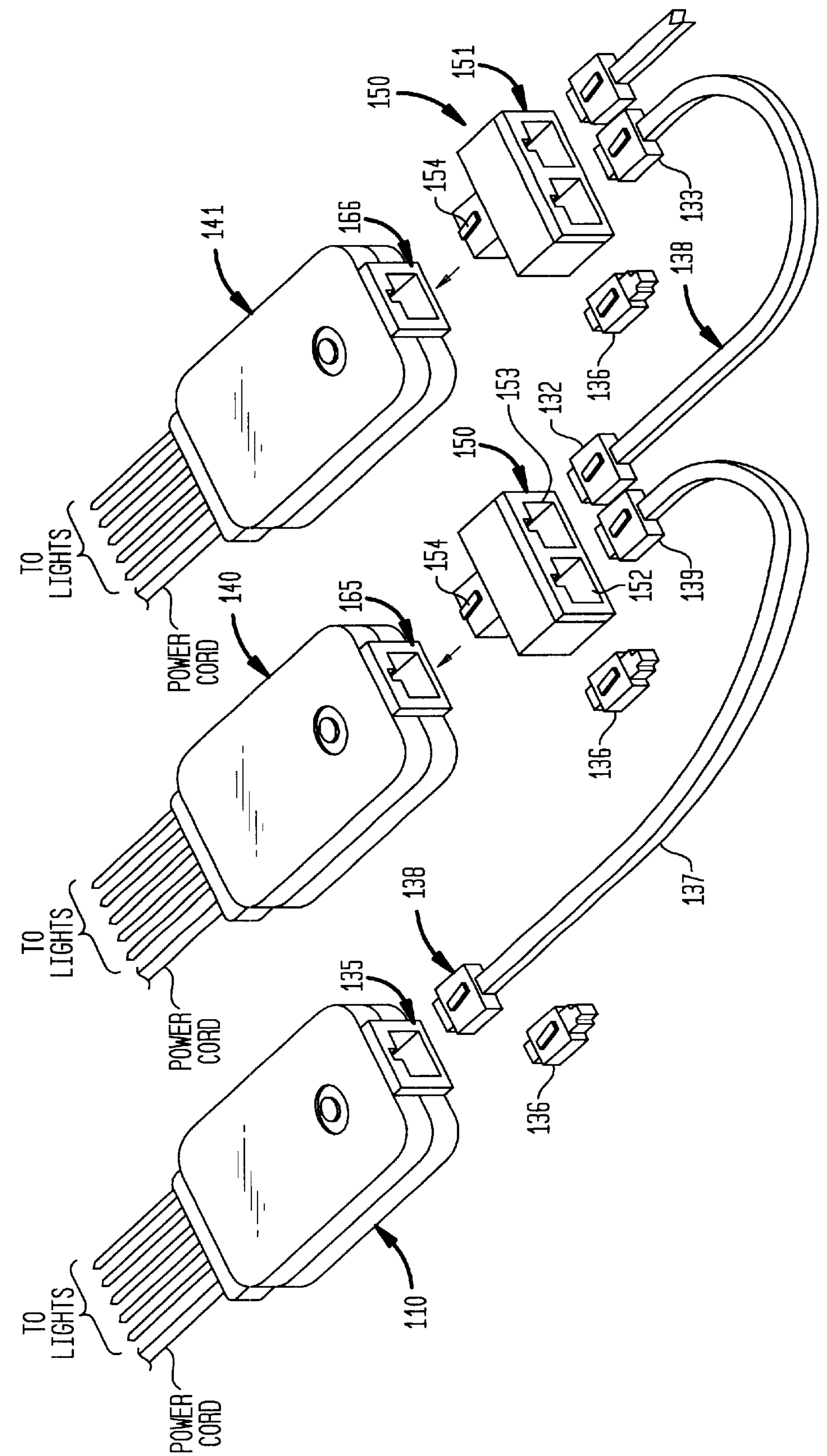
FIG. 2 is an oblique view of an exemplary light control system including a master control unit, a plurality of slave control units and a connector cable arrangement according to another embodiment of the present invention.

Referring now to FIG. 2, a master-slave lighting system according to another embodiment of the present invention is shown including a plurality of slave control units 140, 141 connected in daisy-chain fashion to one master control unit 110 via connection cables 137, 138. Master control unit 110 and slave control units 140, 141 contain the same elements as the master control unit 10 described above with respect to FIG. 1. Female connectors 135, 165 and 166 accept master male connector 138 and "T" plugs 150, 151 respectively. "T" plugs 150, 151 are used to expand the connectivity capability of the singular female connector on each control unit. With respect to electrical connectivity, each "T" plug, e.g. 150, provides a simple electrical "Y" connection from each corresponding lead in the two female connectors, e.g. 152, 153 to the corresponding lead of the male connector, e.g. 154. To provide the daisy-chain connectivity, master male connector 138 is electrically coupled with slave male connector 139 via connection cable 137. Slave mode connector 139 is, in turn, inserted into one female receptacle, e.g. 152, in "T" plug 150. As with each subsequently attached light string in the daisy-chain configuration, slave male connector 132 and 133 are electrically coupled via connection cable 138 and are each inserted into one female receptacle on the "T" plugs 150 and 151 associated with respective adjacent slave control units 140 and 141. Thus, a plurality of slave control units 140, 141 may be electrically connected to extend the length of the total lighting chain, wherein overall control of the light loads is provided by the master control unit but power is individually supplied to each group of light loads by the associated control unit.

Figure 3:
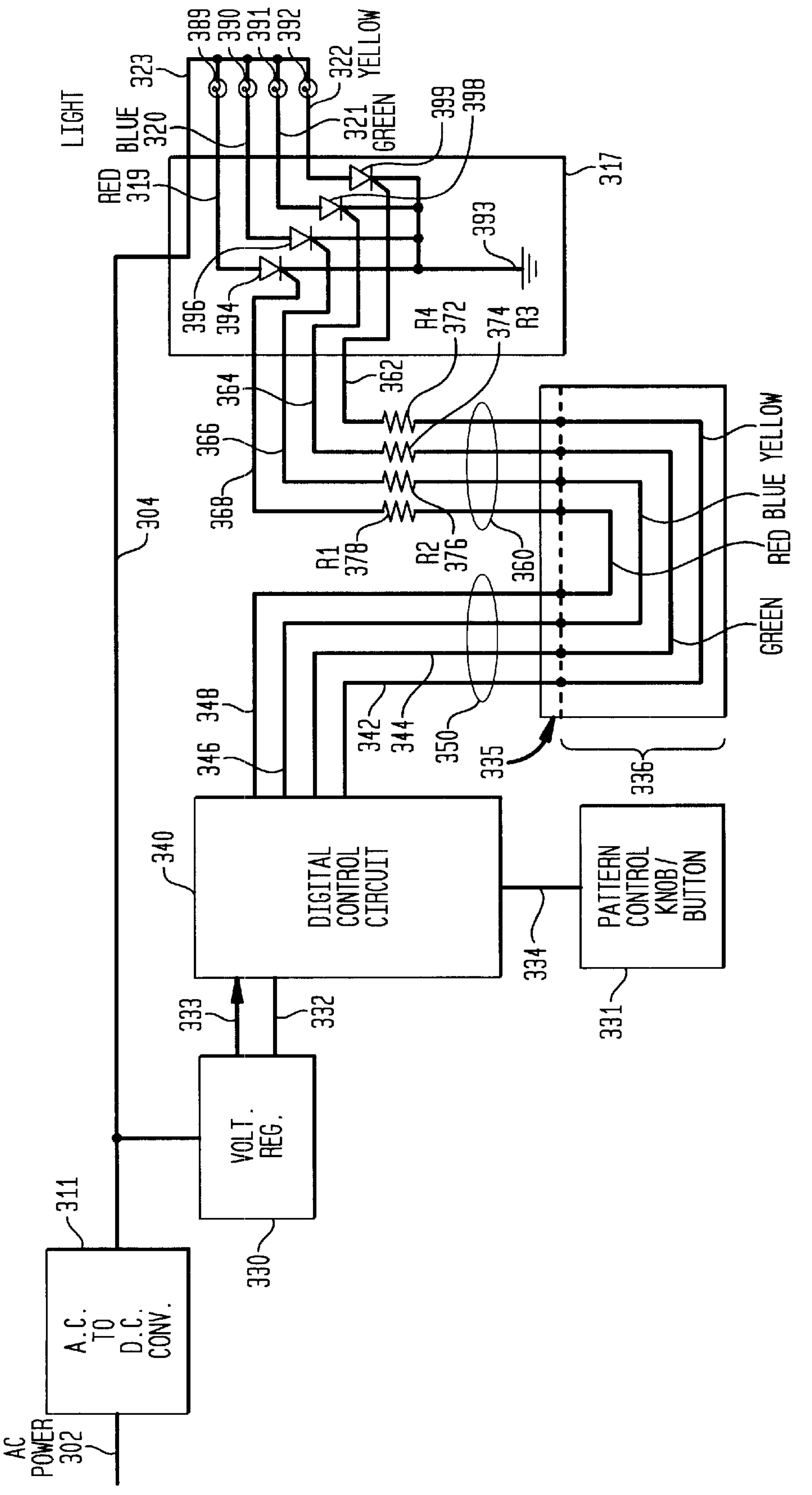
FIG. 3 is a schematic diagram showing one configuration of the light control system of the present invention including a particular electrical interconnection of the system components.

FIG. 3 shows a schematic block diagram of the electrical components within a control unit specifically configured for stand-alone operation via male jumper plug 336. All components of FIG. 3, except the lights, are preferably mounted on a printed circuit board that is mechanically secured within the housing of the control unit. As shown in FIG. 3, AC power from the external power cord is supplied on AC power path 302. AC power provided on AC power path 302 is fed to an AC to DC converter 311. AC to DC converter 311 provides DC power along DC power path 304 to light driver block 317 and voltage regulator 330. Voltage regulator 330 is electrically coupled to digital control circuit or sequence controller 340 via control power coupling 332. Digital control circuit 340 provides lighting control signals on electrically connected individual lighting control paths 342, 344, 346, 348, collectively comprising lighting control bus 350. The individual lighting control paths 342, 344, 346, 348 are connected to four pins on female connector 335.

Also shown in FIG. 3, light driver block 317 electrically couples each group of light bulbs on the light string to one common power supply path 323 and one of individual return power paths, 319-323. Each group of light bulbs on the light string is controlled by lighting control signals provided on individual lighting control paths 362, 364, 366 and 368, which collectively comprise a second lighting control bus 360. Individual lighting control paths 362, 364, 366 and 368 are also electrically coupled to four pins on female connector 335 through pull-up resistors 372, 374, 376, and 378 respectively. In a preferred embodiment of the present invention, the different lighting groups include a group of red lights 389, a group of blue lights 390, a group of green lights 391, and a group of yellow lights 392.

The AC to DC converter 311 preferably consists of four diodes (e.g. 1N4004s) forming a full-wave bridge rectifier. AC power provided on AC power path 302 is full-wave rectified to provide a DC power signal on DC power path 304. The AC to DC converter may also optionally contain a DC power signal smoother (not shown) to provide a constant DC voltage, e.g. 5 volts, on DC power path 304. Alternatively, by omitting the DC power signal smoother, the DC power waveform on DC power path 304 will consist of a series of positive voltage, half sinusoidal shaped power pulses. These positive voltage, half-sinusoidal pulses have a frequency of 60 Hz and an average DC component that is used to supply power to both the voltage regulator 330 and the plurality of light groups.

Voltage regulator 330 accepts the half-sinusoidal voltage presented on DC power path 304 and provides a steady 5 volt or 3 volt DC voltage on power coupling 332 for the digital control circuit. Voltage regulator 330 may contain Zener diodes and other power signal conditioning circuitry to provide the required DC voltage and wave form to digital control circuit 340.

In a preferred embodiment of the present invention, digital control circuit or sequence controller 340 comprises a digital memory coupled to digital control logic, for example, a microprocessor, a programmable gate array ("PGA") or a digital state machine. The digital memory is configured to store a sequence of lighting signals that are sequentially output onto digital control bus 350 by the digital control circuit after retrieval from digital memory. For example, a sequence of 0011, 1100 and 1010 may be stored sequentially within the digital memory. When the sequence 0011 stored within the digital memory is reached, the digital control circuit outputs the lighting signal 0011 onto individual lighting control paths 342, 344, 346 and 348 respectively, which may, in one particular example, indicate that the red and blue light groups should be lighted while the green and yellow light groups should remain off. In this manner, the digital control circuit sequentially addressed consecutive digital memory locations to retrieve a lighting control signal set to be provided as control signals on first lighting control bus 350. The digital control circuit may advance automatically through the associated digital memory under the control of an associated oscillator or crystal clock. Alternatively, digital control circuit 340, which is coupled to pattern control button 331, may be manually advanced though the associated digital memory by pushing the pattern control button 331 on the outside of the control unit. Pattern control button 331 provides signals along path 334 to manually advance the digital control circuit to sequentially access lighting control signal sets within associated digital memory and output the lighting signals onto lighting control path.

In a preferred embodiment of the present invention, light driver block 317 includes individual light device drivers 394, 396, 398 and 399. Individual light drivers may be silicon controlled rectifiers (SCRs), such as part number PCR 406J, that electrically couple at the anode to the individual light groups loads 389, 390, 391 and 392 and are commonly coupled to a return supply path 393 as part of the DC power path 304. The control leads of the SCRs are electrically coupled to the individual light control paths 362, 364, 366 and 368 from second lighting control bus 360. When no current is driven on individual light control paths 362, 364, 366 and 368, the SCRs remain in an OFF state and no power is drawn from the positive rail of DC power path 304 to power the individual light group loads on the light string. When current is driven on individual light control paths, however, the SCRs are turned ON so that current from the positive rail of the DC power path 304 flows through the light bulbs within light groups 389–392 to the common ground rail 393 of the DC power path 304, thereby turning the light bulbs on.

The control unit may be configured to operate in a stand-alone configuration, i.e. with no additional daisy-chained light strings and control units, by inserting the male jumper plug 36 into female connector 35, both shown in FIG. 1. With respect to the electrical connectivity shown in FIG. 3, male jumper plug 336 provides a direct electrical connection between the individual light control paths of light control bus 350 and the individual light control paths of the second lighting control bus 360 on one-for-one basis. The electrical connectivity provided by male jumper plug 36 is shown within electrical connector 336 in FIG. 3. In particular, four leads within female connector 335 are each coupled to a single individual light path controlling a particular color or light group from first lighting control bus 350. The remaining four leads within female connector 335 are electrically coupled to the corresponding individual light control paths within second lighting control bus 360. Thus, lighting control signals presented on first light control bus 350 are communicated directly to the equivalent control paths on second light control bus 360 thereby illuminating the desired light groups via the light driver block as previously described.

A threshold voltage is required on DC power bus 304 to turn the SCRs ON when the lighting control signals on the second light control bus are triggering the SCRs. Once this threshold voltage is reached, the resulting brightness of the individual light bulbs is determined by the portion of the half-sinusoid DC power signal period during which the control signals are triggered. The longer the SCRs are triggered during the half-sinusoidal cycle, the more power that is output by the light loads. Typically, the SCRs are repeatedly fired, once per half-sinusoidal cycle, at the same DC voltage point according to the lighting pattern to be effected. Triggering the SCRs at the same DC voltage point will result in a constant output power detected by observers of the lights. In a preferred embodiment, digital control circuit 340 outputs sequentially the digitally stored sets of light control signals, essentially on/off signals, as described above over the second lighting control path to form a triggering pattern. For example, a stored pattern of light control signals 0011, 0101, 1100, issued on lighting signal paths 362–368 would result in the following lighting pattern, where each step of the pattern exists for a period of time measured by the number of sequential firings of the SCRs for that pattern: yellow:OFF\green:OFF\blue:ON\red:ON; yellow:OFF\green:ON\blue:OFF\red:ON; and yellow:ON\green:ON\blue:OFF\red:OFF. This lighting method is commonly used in "sequenced" light sets.

It should be noted that the triggering point for the SCRS, i.e. the portion of the half-sinusoid DC power signal period during which the control signals are triggered, may be dynamically varied during any triggering pattern. Since the SCRs are repeatedly fired, but not always at the same point on the half-sinusoidal cycle of the DC power signal on DC power path 304, the output power detected by observers of the lights will appear to dim and brighten as the triggering point changes. In this regard, digital control circuit 340 may accept an additional power supply signal 333 provided by voltage regulator 330 indicating the voltage present on DC power path 304.

Figure 4:
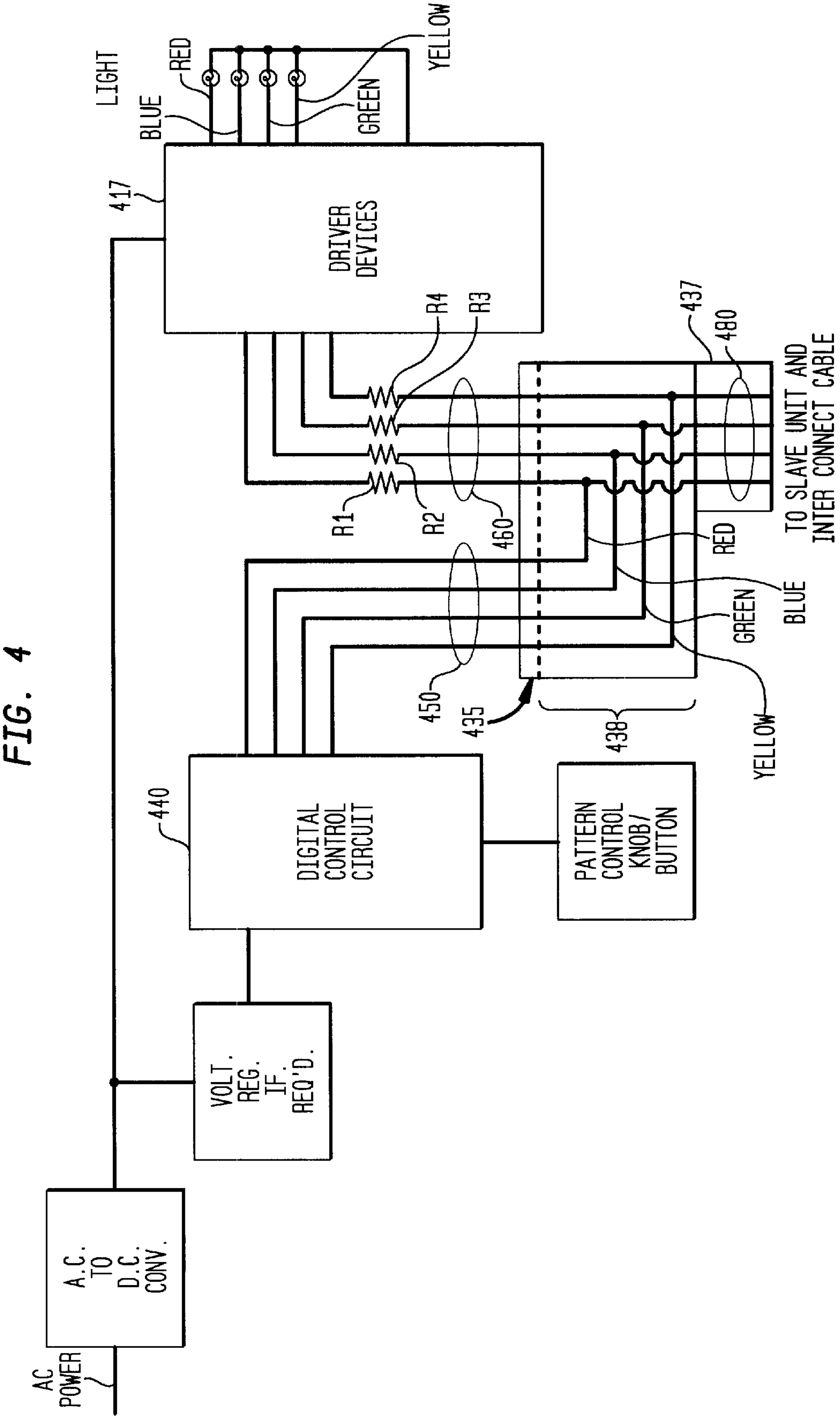
FIG. 4 is a second schematic diagram showing another configuration of the light control system of the present invention including another particular electrical interconnection of the system components.

FIG. 4 shows a schematic block diagram of the electrical components within a control unit specifically configured as a master control unit via master male connector 438. Master male connector 438 shows the internal circuitry of the mater male connector 38 of FIG. 1 as coupled with female connector 435 in the master control unit 10. The basic operation of the master control unit is identical to that provided above with respect to the stand-alone configuration of FIG. 3 with the following differences. As shown in FIG. 4, lighting control bus 450 coupled to sequence controller 440 is directly coupled to second lighting control bus 460 on a one-to-one signal basis via the circuit paths within master male connector 438. As with the stand-alone configuration of FIG. 3, the individual light sets or color groups are subsequently driven by light driver block 417 according to light control signals provided by sequence controller 440 on the first and second light control busses 450 and 460 according to either of the lighting methods provided above. In addition, however, the lighting control signals provided on first lighting control bus 450 are also routed over light control bus 480 provided within interconnection cable 437 that is connected to master male connector 438. Lighting control signal bus 480 is routed to sequentially connected slave control units via connection cables and "T" plugs as shown in FIG. 2. In this fashion, lighting control signals issued by digital control circuit 440 are routed to both the light driver block 417 of the master control unit as well as the female connectors on slave units attached to the connection cable shown in FIGS. 1 and 2.

Figure 5:
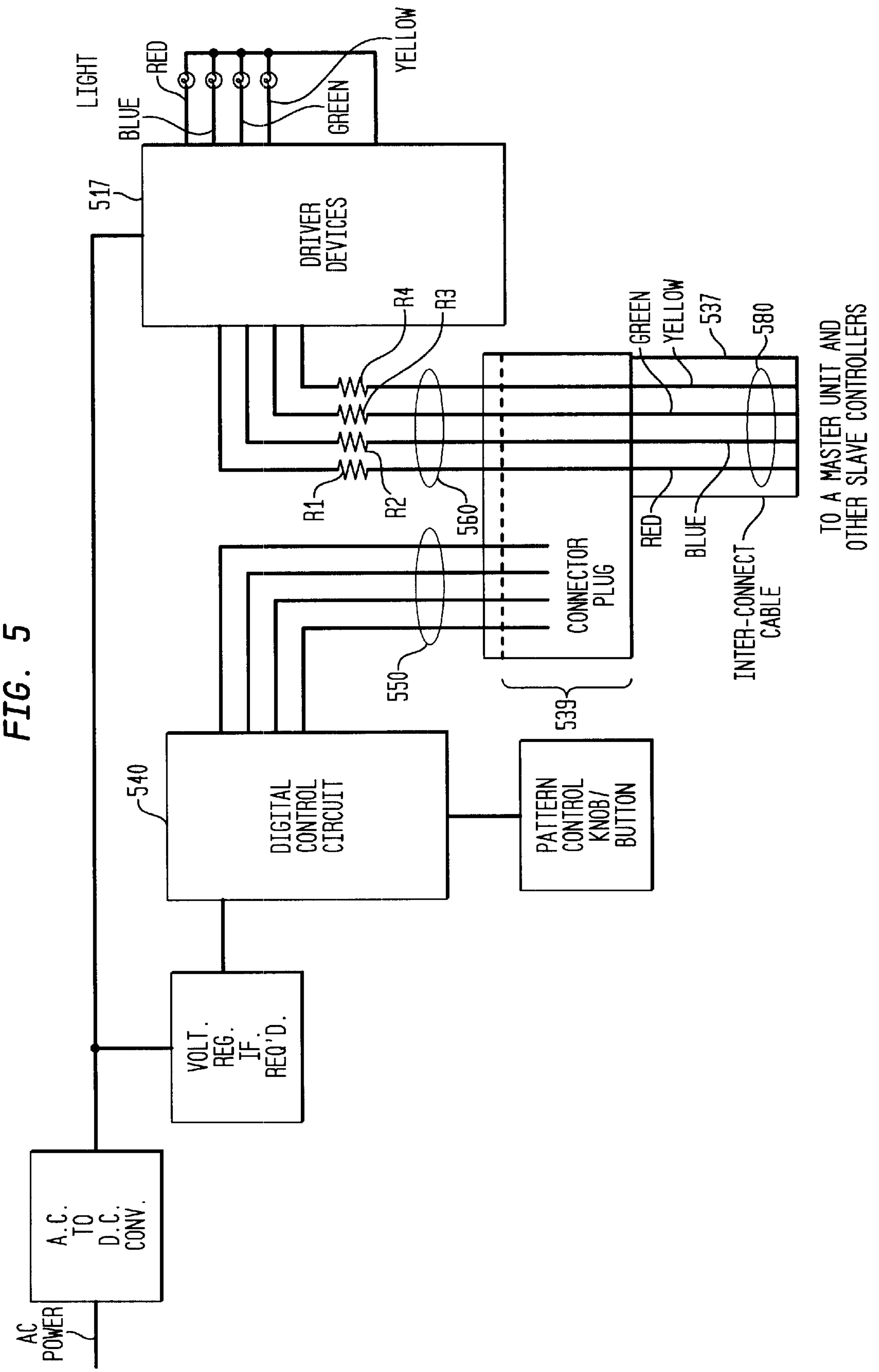
FIG. 5 is a third schematic diagram showing another configuration of the light control system of the present invention including another particular electrical interconnection of the system components.

FIG. 5 shows a schematic block diagram of the electrical components within a control unit specifically configured as a slave control unit via slave male connector 539. Slave male connector 539 shows the internal circuitry of the slave male connector 39 (FIG. 1) as coupled with female connector 435 in the slave control unit 40 (FIG. 1). The basic operation of the slave control unit is identical to that provided above with respect to the stand-alone configuration of FIG. 3 with the following differences. As shown in FIG. 5, slave male connector 539 is configured so as to permit lighting control signals routed on interconnection cable 537 over external lighting control bus 580 to be routed to second lighting control bus 560. Unlike the stand-alone and master configurations for the control units, however, light control bus 550 connected to the sequence controller 540 remains uncoupled to second light control bus 560 so as to isolate that sequence controller from the lighting sequence presented to light driver block 517. In this fashion, lighting control signals generated by the sequence controller of a master control unit, e.g. 440 of FIG. 4, are routed over external lighting control bus 580 to the second light control bus to directly drive the light string of the slave control unit through light driver block 517. Although digital control circuit 540 plays no part in driving the lights on the light string associated with the slave unit, the digital control circuit may actually function to provide light control signals on the light control bus 550 although they will remain unexpressed with respect to the lighting of the lights coupled to the slave control unit.

Pull-up resistors $R_1$, $R_2$, $R_3$ and $R_4$ are placed in series with the individual lighting control paths of second lighting control buses 360, 460 and 560, i.e. in each of the three configurations. Pull-up resistors $R_1$-$R_4$ provide the proper pull-up voltage at the input of the SCRs within the lighting control block. As empirically determined, a resistance value of 4 kΩ provides a sufficient driving current to turn on the SCRs within device driver blocks 417 and 517 when eight slave units are daisy-chained connected to a single master control unit as shown in FIG. 2. Although the exact resistance value depends on the resistance and lengths of the interconnection cables and the driving capability of the outputs from the digital control circuit the number of slave units capable of being daisy-chained may be altered through the selection of appropriate resistance values for resistors $R_1$-$R_4$.

Figure 6A:
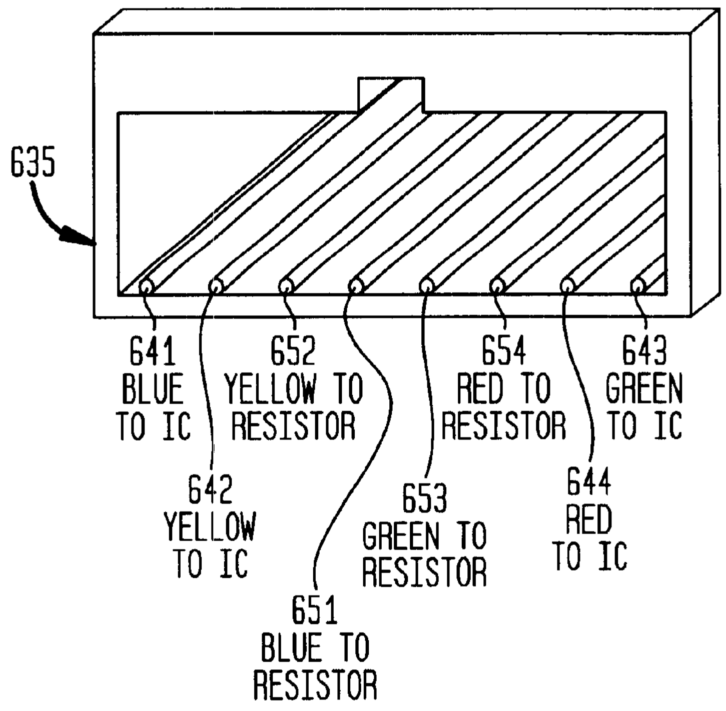
FIG. 6A is a wiring identification diagram for a female connector incorporated as a part of the control units according to one embodiment of the present invention.

FIG. 6A shows a more detailed version of the female connector 35 and 65 for the control units. In a particularly preferred embodiment, female connector 635 comprises eight signal leads, four of which are electrically coupled to the individual lighting paths of the first light control bus and four of which are electrically coupled to the individual lighting paths of the second light control bus, for example elements 350 and 360 respectively. As shown in FIG. 6A, signal leads 641, 642, 643 and 644 are electrically coupled to the individual lighting paths of the first lighting control bus, that is, in turn, electrically coupled to the digital control circuit. Signal leads 651, 652, 653 and 654 are electrically coupled to the individual lighting paths of the second lighting control bus that are, in turn, electrically coupled via the pull-up resistors to the SCRs within the light driver block. Physically, female connector 635 may comprise an industry-standard, category 5, eight-wire connector typically used for computer interconnections.

Figure 6B:
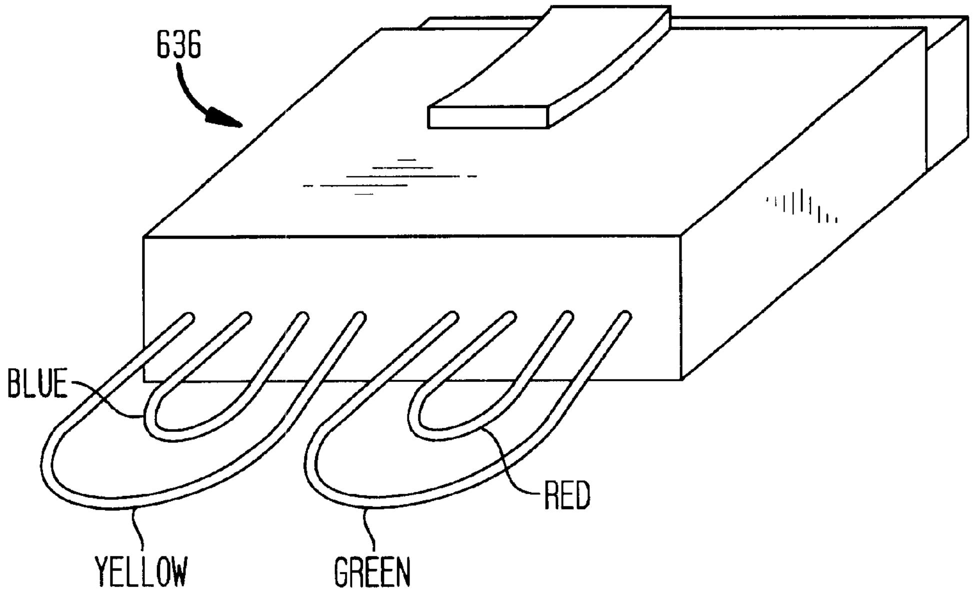
FIG. 6B is a wiring identification diagram for a male configuration plug used to configure control units according to one embodiment of the present invention.

FIG. 6B shows a stand-alone male jumper plug 636 that is inserted into female connector 635 on the control unit so as to configure the control unit to operate in stand-alone fashion as described with respect to FIG. 3. In this regard, male stand-alone jumper plug 636 provides signal leads that connect to female connector leads 641–644 and 651–654. Further, the leads of male jumper plug are internally connected such that the corresponding light control path of the first and second light control busses are coupled as provided by the wiring shown in element 336 of FIG. 3

Figure 7:
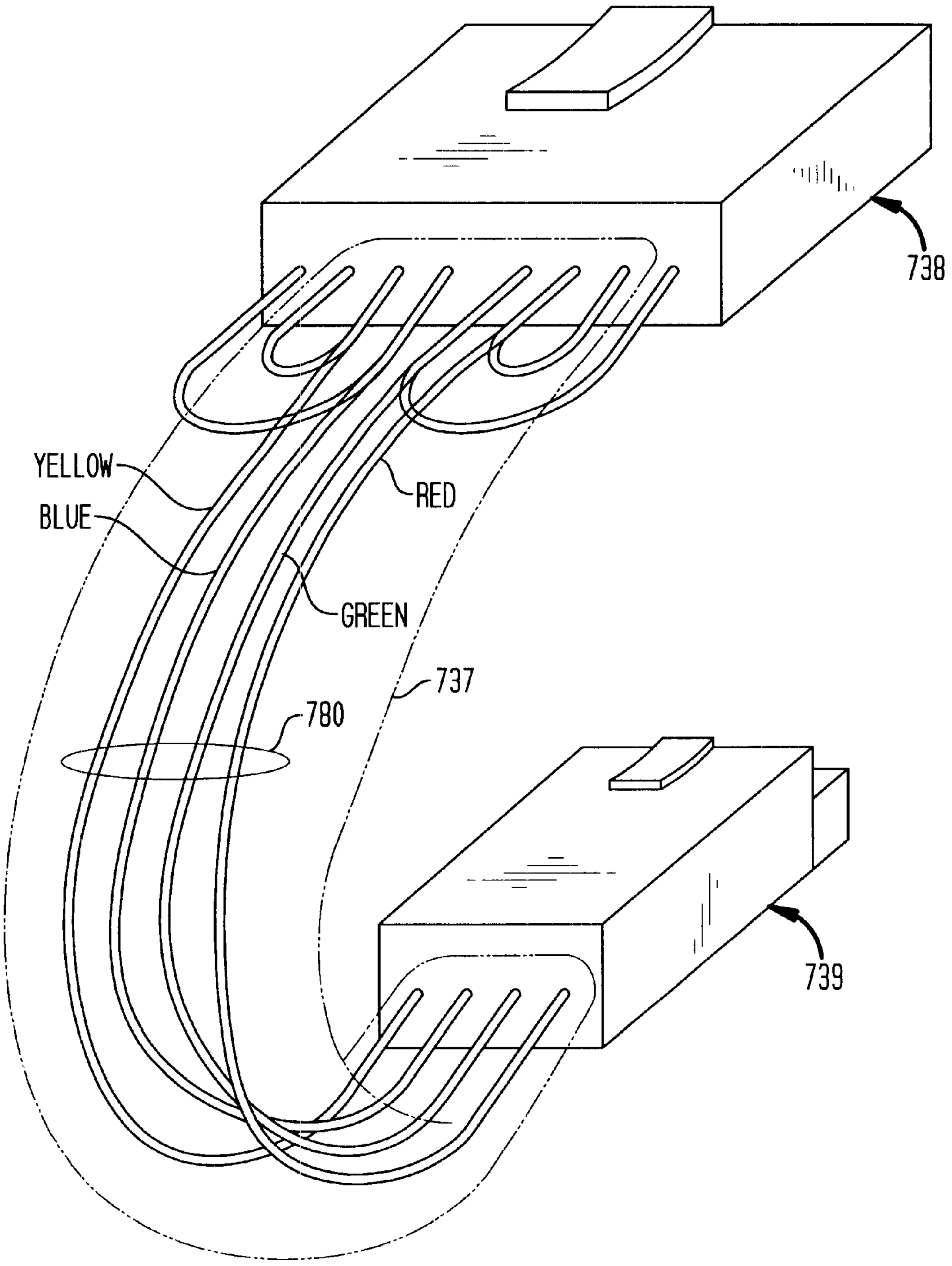
FIG. 7 is a wiring identification diagram showing the interconnection of a master male plug and a slave male plug and the wiring of the interconnection cable according to one embodiment of the present invention.

FIG. 7 shows an external view of master male connector 738 and slave male connector 739 along with the lighting signal bus 780 contained within connection cable 737. Male master connector 738 contains signal leads that connect to signal leads 641–644 and 651–654 of the female connector on the master control unit as shown in FIG. 6A. Further, master male connector 738 routes the signals provided by the first lighting control bus and the female connector of the master control unit through connection cable 737 and over external light control bus 780, corresponding substantially with external lighting signal control bus 480 shown in FIG. 4. The lighting control signals so provided are subsequently routed to the second lighting control bus of coupled slave control units through the signal leads of the female connectors disposed thereon.

Those of skill in the art will recognize that hardware used to provide the dynamic configuration of the control units, i.e. the male connectors, may be replaced with other, equivalent structures that perform the same function. In particular, the wiring within the male connectors may be replaced with digital switches on the circuit cards within each control unit. In this arrangement, it is envisioned that the digital control circuit would then be able to configure, on a real-time, dynamic basis, the configuration of each control unit. For example, a series of daisy-chained control units may function as individual stand-alone units in a first time period, may function with one of the control units acting as master in a second time period, and yet may function with another of the control units acting as master in a third time period; all without the need to physically insert and remove physical connectors on the control unit. In addition, repeater amplifiers may be coupled between sequential daisy-chained groups of light strings so as to boost the illumination control signal strength and increase the overall distance and number of light strings controlled by a single master control unit.

Those of skill in the art will also appreciate that the specific embodiments of the interconnection cabling may be replaced with other, equivalent interconnection apparatus that perform according to the present invention. In particular, the first and second light control busses and the interconnections provided by the male/female connectors and cabling may be replaced with a serial or parallel signal transmission bus over which digital control messages are sent from the digital control circuit. In this embodiment, some type of signal decoding function would be provided at the light driver block to interpret the control signals so as to active the proper light strings.

Those of skill in the art will realize also that each of the digital control circuits may comprise a microcontroller or other sequential logic that is connected to and controlled by a central computer such as a PC. The executed programs for the sequence of lighting patters may then be stored within the central PC memory and output to each of the digital control circuits as needed to effect the desired lighting pattern.

Although the light strings are not specifically described herein, the lighting groups or color groups 389–392 comprising each light string may comprise any one of a number of groups. The specific example set forth in this disclosure describes different color groups, although any subset arrangement of light loads may be placed on each light group to be individually controlled by the present invention. It should be noted that although groups of lights are controlled in common, the individual lights on the light string may occupy any physical position on the string. As an example, an illumination method, known as “chasing,” may be effected when different light groups are sequentially staggered along the light string. That is, a light bulb from a first light group is followed by a light bulb from a second group and so on until the groups begin to repeat. In this method, sequential firing of the different light groups cause the lights on the light string to appear as though a single colored light is “moving” down the string.

With respect to other types of lighting loads, those of skill in the art will realize also that each light group may consist of other types of lights that operate according to the distributed lighting pattern. For example, different colored or specifically positioned groups of flood lights, lighted deer or entire fiber optic trees may act as the individual light loads within the light groups. As described above with respect to the individual light bulbs, these light “loads” would be illuminated by the distributed lighting pattern provided by the digital control circuit or PC for the master control unit.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention. In particular, the embodiments described herein may be used to support any type of outdoor decoration that uses an associated light or electrical equipment and for which protection from the outdoor environment is required for those components while still proving adequate ventilation within the support. Further, the particular claimed sequence of the method steps need not be followed exactly to achieve the objectives of this invention.

What is claimed is:

1. A control unit for attachment to a light string, said light string having a plurality of lights, said plurality of lights arranged as a plurality of sets of lights each set of lights displaying a single color, said control unit comprising:

(a) a light driver coupled to said plurality of lights with a power bus for controlling power to said plurality of lights, said power bus having individual power control signals for controlling power to each set of lights displaying the same color;

(b) a sequence controller coupled to said light driver with a control bus, said sequence controller generating a plurality of light control signals transmitted over said control bus, each light control signal operatively coupled by said light driver to one of said individual power control signals;

(c) a connector coupled to said control bus, said connector including a set of transmitting leads for transmitting said control signals on said control bus outside of said control unit, said connector further including a set of receiving leads for receiving control signals on said control bus from outside of said control unit; and (d) a configuration selector, said configuration selector coupling said sequence controller, said light driver and said transmitting leads so that said control signals from said sequence controller are routed over said control bus to said light driver and said transmitting leads in a first configuration, said configuration selector decoupling said sequence controller from said light driver and coupling said receiving leads to said light driver so that said control signals from said receiving leads are router over said control bus to said light driver in a second configuration.

2. control unit of claim 1 further comprising an AC to DC converter coupled to said light driver for supplying power to said light driver.

3. The control unit of claim 1 further comprising a pattern control knob coupled to said sequence controller for actuating said sequence controller to generate said light control signals.

4. The control unit of claim 1 wherein said configuration selector includes a connector plug for coupling with said connector, said connector plug including said couplings of either said first or said second configurations.

5. The control unit of claim 1 wherein said sequence controller includes a microcontroller.

6. The control unit of claim 1 wherein said sequence controller includes a personal computer.

7. A system of synchronized lighting, said system comprising:

a plurality of light strings, each light string having a plurality of lights, said plurality of lights arranged as a plurality of sets of lights, each set of lights displaying a single color;

a control unit coupled to each light string and said plurality of lights, said control unit including:

(a) a light driver coupled to said plurality of lights with a power bus for controlling power to said plurality of lights, said power bus having individual power control signals for controlling power to each set of lights displaying the same color;

(b) a sequence controller coupled to said light driver with a control bus, said sequence controller generating a plurality of light control signals transmitted over said control bus, each light control signal operatively coupled by said light driver to one of said individual power control signals;

(c) a connector coupled to said control bus, said connector including a set of transmitting leads for transmitting said control signals on said control bus outside of said control unit, said connector further including a set of receiving leads for receiving control signals on said control bus from outside of said control unit;

(d) a configuration selector, said configuration selector coupling said sequence controller, said light driver and said transmitting leads so that said control signals from said sequence controller are routed over said control bus to said light driver and said transmitting leads in a first configuration, said configuration selector decoupling said sequence controller from said light driver and coupling said receiving leads to said light driver so that said control signals from said receiving leads are routed over said control bus to said light driver in a second configuration; and wherein one of said control units has said first configuration and the other of said control units have said second configuration, said transmitting leads of said control unit having said first configuration coupled to said receiving leads of each of the control units having said second configuration, said sequence controller of said control unit having said first configuration generating control signals that are routed to each light driver so as to simultaneously control each set of lights having the same color on each of said plurality of light strings.

8. The system of claim 7 further comprising a pattern control knob coupled to said sequence controller of said control unit having said first configuration for actuating said sequence controller to generate said light control signals.

9. The control unit of claim 7 wherein said configuration selector includes a connector plug for coupling with said connector, said connector plug including said couplings of either said first or said second configurations.

10. The system of claim 7 wherein paid control units are dynamically configurable between said first and said second configurations.

11. A system for synchronizing a plurality of lights, said system comprising:

a first and second light strings having a first and second plurality of lights respectively;

a first light group including a subset of lights from said first plurality of lights;

a second light group including a subset of lights from said second plurality of lights;

a sequence controller coupled to said first light string and said first plurality of lights, said sequence controller generating control signals transmitted over said coupling for controlling said first light group;

a first connector coupled to said first light string, said first plurality of lights and said sequence controller, said first connector including signal paths for transmitting said control signals; and a second connector coupled to said second light string and said second plurality of lights, said second connector including signal paths for receiving said control signals, said second connector connected to said first connector with an interconnection cable, said an interconnection cable capable of transmitting said control signals between said first and said second connectors, said sequence controller synchronously controlling both said first light group and said second light group via said control signals transmitted over said first and second connectors and said an interconnection cable.

12. The system of claim 11 further comprising a first light driver and a second light driver coupled to said first light string and said second light string respectively, said first and second light drivers providing power to said first plurality of lights and said second plurality of lights respectively.

13. The system of claim 11 wherein said first and second groups of lights are groups of lights of the same color.

14. A system for synchronizing a plurality of lights, said system comprising:

a plurality of light strings, each light string including a plurality of lights, said plurality of light strings including a master light string, said plurality of lights within each light string associated with a plurality of light groups, each light group including a subset of said plurality of lights on each light string;

a master connector coupled to said master light string and said included plurality of lights;

a sequence controller coupled to said master connector, said sequence controller generating control signals for controlling each light group within said plurality of lights on said master light string; and a plurality of slave connectors, each slave connector coupled to one of said remaining plurality of light strings and said included plurality of lights, each of said slave connectors coupled to at least one other connector with an interconnection cable, at least one slave connector also directly coupled to said master connector with an interconnection cable, said plurality of slave connector couplings arranged such that each of said plurality of light strings and said included plurality of lights is also coupled to said master connector, said interconnection cable capable of transmitting signals between coupled connectors for controlling each light group within said coupled light strings, said sequence controller independently controlling each light group of said master light string in synchrony with said plurality of light groups of said remaining light strings via said plurality of couplings of said master and slave connectors.

15. The system of claim 14 wherein said sequence controller includes a computer.

16. A method of synchronously controlling a plurality of lights comprising:

configuring a first control bus of a first control unit, said step of configuring including coupling a sequence controller, a first light string and a first connector to said control bus, said first light string having a plurality of lights, said plurality of lights of said first light string including a plurality colors;

configuring a second control bus of a second control unit, said step of configuring including coupling a second connector, a second light string, and a second control bus, said second light string having a plurality of lights, said plurality of lights of said second light string arranged as a plurality of sets of lights, said plurality of lights of said second light string including a plurality colors;

coupling said first connector and said second connector so as to couple said first and second control buses;

generating said control signals with said sequence controller; and routing said control signals to said first and second control busses and said plurality of lights of said first and second light strings to simultaneously control lights of the same color.

17. The method of claim 16 wherein said step of generating includes executing program steps within a computer.

18. A system of synchronously controlling a plurality of lights comprising:

a plurality of light strings, each light string including a plurality of lights, said plurality of light strings including a master light string, said plurality of lights within each light string associated with a plurality of light groups, each light group including a subset of said plurality of lights on each light string;

a master connector coupled to said master light string and said included plurality of lights;

a sequence controller coupled to said master connector, said sequence controller generating control signals transmitted over said coupling for controlling each light group within said plurality of lights on said master light string; and a plurality of slave connectors, each slave connector coupled to one of said remaining plurality of light strings and said included plurality of lights, each of said slave connectors coupled to at least one other connector with an interconnection cable, at least one slave connector also directly coupled to said master connector with a an interconnection cable, said plurality of slave connector couplings arranged such that each of said plurality of light strings and said included plurality lights is also an interconnection cable to said master connector, said interconnection cable capable of transmitting signals between coupled connectors for controlling each light group within said coupled light strings, said sequence controller independently controlling each light group of said master light string in synchrony with said plurality of light groups of said remaining light strings via said plurality of couplings of said master and slave connectors.

19. The system of claim 18 wherein said sequence controller includes a computer.

* * * * *